United States Patent
Ali et al.

(10) Patent No.: US 12,321,779 B2
(45) Date of Patent: Jun. 3, 2025

(54) CONTEXT RELEVANT DATA MIGRATION AND JOB RESCHEDULING

(71) Applicant: INTERNATIONAL BUSINESS MACHINES CORPORATION, Armonk, NY (US)

(72) Inventors: Asmahan Ali, Poughkeepsie, NY (US); Daniel De Souza Casali, Elmhurst, NY (US); Abhishek Jain, Baraut (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 17/654,855

(22) Filed: Mar. 15, 2022

(65) Prior Publication Data

US 2023/0297417 A1    Sep. 21, 2023

(51) Int. Cl.
  *G06F 3/00*     (2006.01)
  *G06F 3/06*     (2006.01)
  *G06F 9/48*     (2006.01)

(52) U.S. Cl.
  CPC .......... *G06F 9/4881* (2013.01); *G06F 3/0613* (2013.01); *G06F 3/0647* (2013.01); *G06F 3/067* (2013.01)

(58) Field of Classification Search
  CPC ........................................................ G06F 9/48
  USPC ....................................................... 718/104
  See application file for complete search history.

(56) References Cited

U.S. PATENT DOCUMENTS

| 8,676,937 | B2 | 3/2014 | Rapaport | |
|---|---|---|---|---|
| 10,142,276 | B2 | 11/2018 | Rapaport | |
| 10,939,182 | B2 | 3/2021 | Boskovich | |
| 2007/0268931 | A1* | 11/2007 | Shaikli | H04J 3/047 370/468 |
| 2010/0031198 | A1* | 2/2010 | Zimmerman | G06F 3/0482 715/853 |
| 2010/0318996 | A1* | 12/2010 | Harris | G06F 9/5033 718/104 |
| 2011/0093854 | A1* | 4/2011 | Blanc | G06F 9/5066 718/101 |

(Continued)

OTHER PUBLICATIONS

Sean K. Barker, Empirical Evaluation of Latency-sensitive Application Performance in the Cloud. (Year: 2010).*

(Continued)

*Primary Examiner* — Lechi Truong
(74) *Attorney, Agent, or Firm* — Stosch Sabo

(57) ABSTRACT

A method, system, and computer program product for context relevant data migration to a cloud server with job rescheduling are provided. The method identifies a contextual situation associated with at least a portion of data sets available for migration to a cloud server by a set of data sources. The method identifies an application associated with the contextual situation. A set of use characteristics are determined for the data sets based on the contextual situation and the application. Bandwidths are determined for one or more data sources. One or more data sets are selected for prioritization based on a contextual relevance, the set of use characteristics, and the bandwidths for the one or more data sources. The method schedules a job processing sequence of the selected one or more data sets based, at least in part, on the contextual relevancy, the set of use characteristics, and the bandwidths.

17 Claims, 6 Drawing Sheets

(56) References Cited

U.S. PATENT DOCUMENTS

| | | | | |
|---|---|---|---|---|
| 2014/0250440 | A1* | 9/2014 | Carter | H04L 67/60 |
| | | | | 718/105 |
| 2015/0278024 | A1* | 10/2015 | Barman | H04L 67/61 |
| | | | | 707/634 |
| 2018/0032362 | A1* | 2/2018 | Buil | H04L 67/10 |
| 2019/0098570 | A1* | 3/2019 | Zhang | H04W 28/00 |
| 2020/0236059 | A1* | 7/2020 | Herle | H04L 67/10 |
| 2021/0157312 | A1* | 5/2021 | Cella | G01M 13/045 |
| 2023/0297417 | A1* | 9/2023 | Ali | G06F 3/0647 |
| | | | | 718/102 |

OTHER PUBLICATIONS

Chandrashekhar S. Pawar, Priority Based Dynamic resource allocation in Cloud Computing. (Year: 2012).*

Tommaso Cucinotta, Migrating Constant Bandwidth Servers on Multi-Cores. (Year: 2021).*

Anonymous et al., "Intelligent Maintenance Scheduler Based on Contextual Analysis," An IP.com Prior Art Database Technical Disclosure IPCOM000266230D, Jun. 24, 2021, 11 pages.

Anonymous et al., "Method and System for AR-Based Configuration of IoT-Enabled Devices Based on Situational Context," An IP.com Prior Art Database Technical Disclosure IPCOM000261475D, Mar. 7, 2020, 5 pages.

Anonymous et al., "Method of Using Contextual Service Discovery to Implicitly Surface Useful External Developer from an IDE," An IP.com Prior Art Database Technical Disclosure, IPCOM000257162D, Jan. 17, 2019, 7 pages.

Anonymous et al., "Workload Discovery and Recommendations for Cloud Migration with AI," An IP.com Prior Art Database Technical Disclosure IPCOM000263649D, Sep. 23, 2020, 11 pages.

James, J. et al.; "Efficient VM Load Balancing Algorithm for a Cloud Computing Environment," International Journal on Computer Science and Engineering, Sept. 9, 2012, pp. 1658-1663.

Mahmud, R. et al.; "Latency-Aware Application Module Management for Fog Computing Environment," ACM Transactions on Internet Technology, vol. 1, No. 1, Article 1, Mar. 2018, 22 pages.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

CONTEXT RELEVANT DATA MIGRATION AND JOB RESCHEDULING

BACKGROUND

Businesses derive intelligence from data using multi-clouds, machine learning, and real-time analytics. Data used by these businesses may be generated by various sources outside and within the business. Data can be pushed to multiple backend cloud servers to provide a multi-cloud approach for business intelligence. Multi-cloud approaches enable businesses to maintain data in multiple locations while maintaining a single access endpoint. Such a multi-cloud approach enables data access independent of vendor or location and allows for considerations of bandwidth and data throughput while providing data to designated business applications.

SUMMARY

According to an embodiment described herein, a computer-implemented method for context relevant data migration to a cloud server with job rescheduling is provided. The method identifies a contextual situation associated with at least a portion of data sets available for migration to a cloud server. The data sets are provided by a set of data sources. The method identifies an application associated with the contextual situation. A set of use characteristics are determined for the data sets based on the contextual situation and the application. Bandwidths are determined for one or more data sources associated with the portion of data sets associated with the contextual situation. One or more data sets are selected for prioritization based on a contextual relevance, the set of use characteristics, and the bandwidths for the one or more data sources. The method schedules a job processing sequence of the selected one or more data sets based, at least in part, on the contextual relevancy, the set of use characteristics, and the bandwidths.

According to an embodiment described herein, a system for context relevant data migration to a cloud server with job rescheduling is provided. The system includes one or more processors and a computer-readable storage medium, coupled to the one or more processors, storing program instructions that, when executed by the one or more processors, cause the one or more processors to perform operations. The operations identify a contextual situation associated with at least a portion of data sets available for migration to a cloud server. The data sets are provided by a set of data sources. The operations identify an application associated with the contextual situation. A set of use characteristics are determined for the data sets based on the contextual situation and the application. Bandwidths are determined for one or more data sources associated with the portion of data sets associated with the contextual situation. One or more data sets are selected for prioritization based on a contextual relevance, the set of use characteristics, and the bandwidths for the one or more data sources. The operations schedule a job processing sequence of the selected one or more data sets based, at least in part, on the contextual relevancy, the set of use characteristics, and the bandwidths.

According to an embodiment described herein, a computer program product for context relevant data migration to a cloud server with job rescheduling is provided. The computer program product includes a computer-readable storage medium having program instructions embodied therewith, the program instructions being executable by one or more processors to cause the one or more processors to identify a contextual situation associated with at least a portion of data sets available for migration to a cloud server. The data sets are provided by a set of data sources. The computer program product identifies an application associated with the contextual situation. A set of use characteristics are determined for the data sets based on the contextual situation and the application. Bandwidths are determined for one or more data sources associated with the portion of data sets associated with the contextual situation. One or more data sets are selected for prioritization based on a contextual relevance, the set of use characteristics, and the bandwidths for the one or more data sources. The computer program product schedules a job processing sequence of the selected one or more data sets based, at least in part, on the contextual relevancy, the set of use characteristics, and the bandwidths.

DETAILED DESCRIPTION

Figure 1:
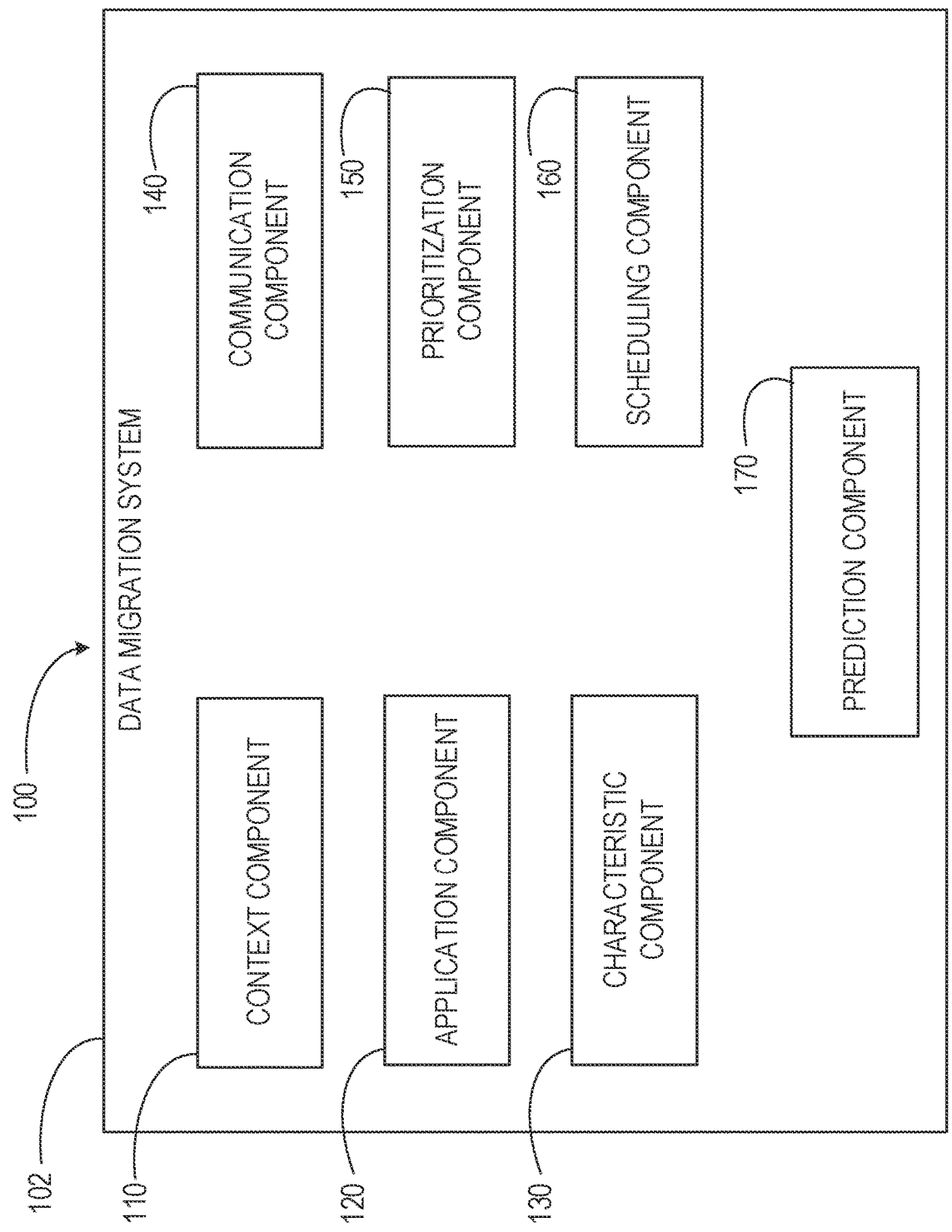
FIG. 1 depicts a block diagram of a computing environment for implementing concepts and computer-based methods, according to at least one embodiment.

The present disclosure relates generally to methods for cloud server data migration. More particularly, but not exclusively, embodiments of the present disclosure relate to a computer-implemented method for context relevant data migration to a cloud server with job rescheduling. The present disclosure relates further to a related system for cloud server data migration, and a computer program product for operating such a system.

Businesses derive intelligence from data using multi-clouds, machine learning, and real-time analytics. Data may be generated for businesses by various sources, such as sensors, user activities, environmental circumstances, and any other suitable manner. This data generation may occur at diverse locations outside or within facilities of a given business. Data can be pushed to multiple backend cloud servers, such as by Simple Storage Service (S3) compatible application programming interfaces (API), to provide a multi-cloud approach for business intelligence. Multi-cloud approaches enable businesses to maintain data in multiple locations while maintaining a single access endpoint. This may increase data availability to businesses. In such systems, businesses often attempt to optimize resources such as system bandwidth and throughput leads. Similarly, such systems are used in effort to save on infrastructure and reduce security risks while making data available on demand.

Current multi-cloud systems are often established to provide real-time access to data at diverse locations. Such multi-cloud systems are often focused on predefined data consumption rates across data sources within the multi-cloud system. However, contextual needs of data consumption may change from time to time. Different contextual situations may require different types and amounts of data processing. Thus, multi-cloud situations may be ill equipped to provide businesses and business users differing types and amounts of data to inform and enable proper decision making during a business flow. Current multi-cloud systems lack the ability to push and prioritize context relevant data to cloud servers in a timely and relevant fashion. Further, multi-cloud backend environments may benefit from data connections which leverage user-defined data flow control policies to assist in generating real-time context relevant data flows. For example, current multi-cloud systems are often based on establishing periodic, time schedule-based job processing to push fixed set sources of data to a cloud resource. These capabilities may not be appropriate for new or changing contexts. Further, such capabilities do not take advantage of network bandwidth variation between a sensor producing data and a data connection or network bandwidth between the data connection and backend cloud resources.

Embodiments of the present disclosure use artificial intelligence to predict contextual situations and data and data sources associated with those contextual situations. The present disclosure enables prediction of contextual need in decision making and identifying appropriate data sets to be pushed or migrated to cloud servers to enable data processing in a timely and contextually relevant fashion. Embodiments of the present disclosure maximize network bandwidth utilization by dynamically adjusting migration speed between data sources and back-end cloud resources. Some embodiments of the present disclosure enable full use of bandwidth and real-time data for changing or newly arising contextual situations on a given network connector. Embodiments of the present disclosure enable prioritization of data based on contextual relevance and available bandwidth. Some embodiments of the present disclosure enable data migration on unused bandwidth within a network connector for preexisting events or situations other than an identified contextual situation.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a data migration system 102. The data migration system 102 may comprise a context component 110, an application component 120, a characteristic component 130, a communication component 140, a prioritization component 150, a scheduling component 160, and a prediction component 170. The context component 110 identifies contextual situations within a cloud computing environment (such as, for example, cloud computing environment 50, shown in FIG. 5). The application component 120 identifies applications associated with contextual situations identified in the cloud computing environment. The characteristic component 130 determines the use characteristics of data sets and characteristics of those data sets. The communication component 140 determines bandwidths for resources within the cloud computing environment. The prioritization component 150 identifies priority scores and selects data sets or data sources for prioritization in the cloud computing environment based on contextual situations. The scheduling component 160 schedules job processing sequences of data sets based on prioritization and identified contextual situations. The prediction component 170 identifies predicted contextual situations and aspects of data sets and data sources relevant to those predicted contextual situations. Although described with distinct components, it should be understood that, in at least some embodiments, components may be combined or divided, and/or additional components may be added without departing from the scope of the present disclosure.

Figure 2:
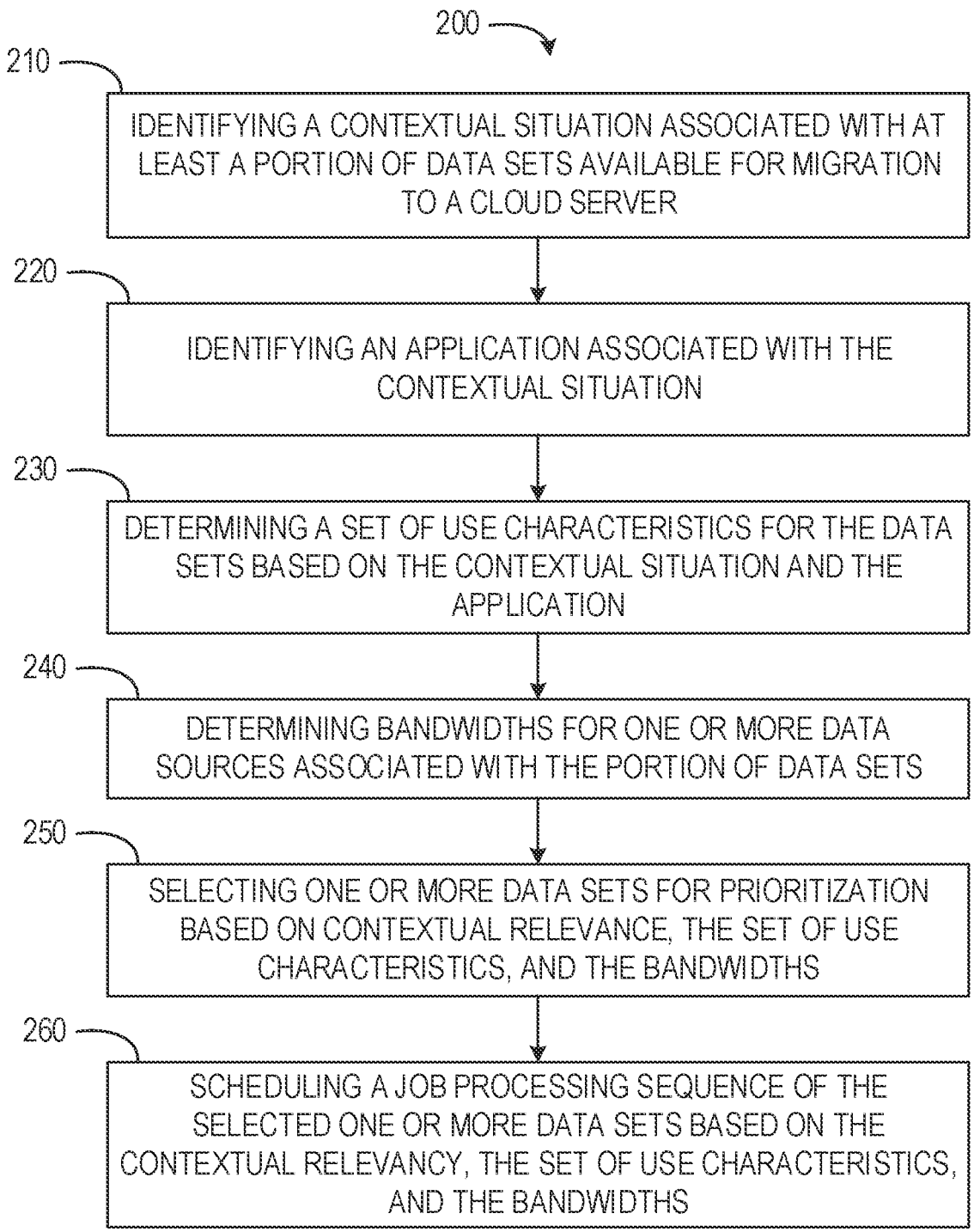
FIG. 2 depicts a flow diagram of a computer-implemented method for context relevant data migration to a cloud server with job rescheduling, according to at least one embodiment.

Referring now to FIG. 2, a flow diagram of a computer-implemented method 200 is shown. The computer-implemented method 200 is a method for context relevant data migration to a cloud server with job rescheduling. In some embodiments, the computer-implemented method 200 may be performed by one or more components of the computing environment 100, as described in more detail below.

At operation 210, the context component 110 identifies a contextual situation. The contextual situation may be identified based on a change of context or initiation of a new context. The contextual situation may be associated with at least a portion of data sets available for migration to a cloud server. In some instances, the data sets are provided by a set of data sources. The data sources may be communicatively coupled to or a part of the cloud server. Different data sources may be generating data contemporaneously. Data may be pushed or migrated into multiple back-end cloud systems or cloud resources. The data may be pushed or migrated in various sequences and at different bandwidth rates.

In some instances, the context component 110 identifies the contextual situation based on various sources of data analysis. For example, the change in contextual situation may be identified as a change in weather condition, a change in transportation system, or any other identifiable contextual situation. Different contextual situations may be associated with different levels of priority in association with different data sources. For example, a new environmental policy may be introduced and be identified as a contextual situation and applications dealing with environmental issues associated with the policy may be provided higher priority.

The sources of data analysis informing identification of the contextual situation can be external influencing factors or internal influencing factors. External influencing factors may include media reports, social networking posts, governmental policies or rules, or published reports. External influencing factors may also include future business plans, merger and acquisition information, and competitor information. External influencing factors may also include applications using data received from data sources, application usage patterns, and application user groups. Although specified factors have been identified as external influencing factors, it should be understood that any suitable and relevant factors, external to the context component 110 or the data migration system 102, may be used as external influencing factors for identifying the contextual situation. Internal influencing factors may include email analysis, internal planning and actions (e.g., IT department planning, deployment, bug fixing, migration, and application outages), meeting minutes, and employee feedback. Internal influencing factors may also include activity scheduling, monthly scheduling, quarterly scheduling, or yearly scheduling. Although specified factors have been identified as internal influencing factors, it should be understood that any suitable and relevant factors, internal to the context component 110 or the data migration system 102, may be used as internal influencing factors for identifying the contextual situation.

By way of example, a weather service may be engaged in data collection or streaming data from multiple data sources in multiple states. Weather events for the weather service may be ranked based on environmental impact and human impact in Table 1, below. Higher scores may indicate a higher impact event.

TABLE 1

| Context Change (Event) | Score |
|---|---|
| Hurricane | 10 |
| Tornado | 9 |
| Tropical Storm | 8 |
| Thunderstorm | 7 |
| Hailstorm | 6 |
| Heat wave | 5 |
| Normal Weather activities | 4 |

Each data center or data source may be connected to a S3 connector providing a single name space interface to different clouds. Each data center may be connected to an S3 connector pod at a different bandwidth. The data centers and bandwidths are shown in Table 2, below.

TABLE 2

| Sensor (Data Source) | Speed to the S3 connector |
|---|---|
| GA | 100 Mbps |
| FL | 80 Mbps |
| CA | 110 Mbps |
| WA | 200 Mbps |

A context change may be identified for an anticipated hurricane in the Atlantic Ocean. The context change may be predicted by a weather analysis pod associated with the context component 110. The contextual situation may be identified for several locations associated with data centers or data sources. The contextual situation relative to the data sources is shown in Table 3, below.

TABLE 3

| Sensor (Data Source) | Prediction | Event (Score) | Speed |
|---|---|---|---|
| GA | Hurricane | 10 | 100 Mbps |
| FL | Hurricane | 10 | 80 Mbps |
| CA | Heat Wave | 5 | 110 Mbps |
| WA | Normal Weather | 4 | 200 Mbps |

At operation 220, The application component 120 identifies an application associated with the contextual situation. The application component 120 may identify the application based on presently running applications, present use of applications, historical use of applications, applications associated with specified cloud servers, applications associated with specified data sources, applications associated with or using specified data sets, and applications associated with or using specified data types. In some embodiments, the application component 120 identifies the application based on business reports for a cloud server or cloud resource.

In the example for Tables 1, 2, and 3, the application component 120 may identify the application as a weather analysis application based on the contextual situation. The application component 120 may also identify the application as a weather analysis application for a cloud resource focusing on geographic areas associated with the location of the contextual situation. In some instances, the application component 120 identifies characteristics of the application. For example, the application component 120 may identify the application as one or more weather analysis application using AMAZON WEB SERVICES® (AWS) and AZURE® as a backend cloud, as shown in Table 4, below.

TABLE 4

| Backend Cloud | Speed to the S3 connector |
|---|---|
| AZURE ® | 40 Mbps |
| IBM Cloud ® | 80 Mbps |
| AWS ® | 85 Mbps |
| SPECTRUM SCALE ® | 100 Mbps |

As shown in Table 4, the backend cloud for the applications may be connected to an S3 connector using different bandwidths. The identified application may be a weather analysis application analyzing hurricanes, whereas other applications accessible to the application component 120 analyze heat wave and other weather activities.

At operation 230, the characteristic component 130 determines a set of use characteristics for the data sets. The characteristic component 130 may determine the set of use characteristics based on the contextual situation. In some instances, the set of use characteristics are determined based on the application. The set of use characteristics may be determined based on historical usage of data sets by one or more applications, historical usage by one or more cloud servers or resources, or using business reports available to the characteristic component 130. In some embodiments, the characteristic component 130 uses historical data to determine the set of use characteristics to represent how users are using one or more data sets. In some instances, the characteristic component 130 identifies how much data is used for different types of contextual situations as part of the use characteristics. For example, for a manufacturing application, only a specified data set may be used for analyzing environmental related contextual situations, and the manufacturing application may consume or otherwise use an averaged amount of data for analyzing the environmental contextual situation.

At operation 240, the communication component 140 determines bandwidths for one or more data sources. The one or more data sources may be associated with the portion of data sets associated with the contextual situation. The bandwidth for the one or more data sources may be a speed or throughput between a data source and the cloud server.

For example, a speed between a data source and an S3 connector may throttle data migration to a cloud server. The speed may also allow data for events with relative scores to be processed in addition contextually relevant data for the contextual situation. Similarly, a speed between an S3 connector and a multi-cloud backend system may throttle an overall migration policy. The migration policy may control data migration from a data source to an S3 connector and from the S3 connector to one or more cloud servers. In the above example, an S3 connector pod may handle data flows of 100 Mbps and a data source may be able to transmit data at a rate of 100 Mbps. The entire bandwidth of the connector may be dedicated to the data source based on the relative data transmission rates. If the connection between the S3 connector and a cloud server is 10 Mbps, the communication component 140 may determine a bandwidth of 10 Mbps for migrating data from the data source, through the S3 connector, to the cloud server. As noted above, a remaining 90 Mbps may be delegated to other data sets coming from the data source. The other data sets may be data sets that are processed by other applications or associated with other contextual situations which have not been identified as a presently occurring contextual situation.

In the example above, the communication component 140 may analyze the bandwidth to the data sources in the table and destination cloud. By way of further example, the communication component 140 may identify that the Georgia data source can send data at 100 Mbps and the Florida data source can send data at 80 Mbps. The communication component 140 may determine that a connector can send data to AWS at a rate of 80 Mbps and to Azure at a rate of 40 Mbps. The connector can then send Hurricane data to back-end clouds at a rate of 120 Mbps combined. As a result, the connector may throttle data migration from Georgia and Florida to migrate only 120 Mbps.

At operation 250, the prioritization component 150 selects one or more data sets for prioritization. The one or more data sets may be selected for prioritization based on a contextual relevance. In some instances, the one or more data sets are selected for prioritization based on a set of use characteristics. In some embodiments, the one or more data sets are selected for prioritization based on the bandwidths for the one or more data sources associated with the one or more data sets.

In some embodiments, the prioritization component 150 assigns a priority score to each data set associated with the contextual situation. The priority scores may be assigned based on event scores generated for each contextual situation, a relevancy of each data set to the contextual situation, and a bandwidth for the one or more data sources associated with each data set.

At operation 260, the scheduling component 160 schedules a job processing sequence of the selected one or more data sets. The job processing sequence may be scheduled, at least in part, based on the contextual relevancy of the data sets, the set of use characteristics, and the bandwidths. The scheduling component 160 may dynamically schedule the job processing sequence so that data of the one or more data sets may be processed and prepared for use by users in light of the identified contextual situation.

In some embodiments, the job processing sequence of the selected one or more data sets is scheduled, at least in part, based on a predicted amount of context relevant data associated with the context situation, one or more data types to be processed together for the contextual situation, and priority scores of the one or more data sets.

In some embodiments, the scheduling component 160 is implemented in a connector between a back-end cloud and a data source. The scheduling component 160 enables the connector to evaluate the bandwidth to the data source, destination cloud, and the predicted event score. The connector may then dynamically tailor a migration policy that gives priority to important events and maximizes bandwidth utilization in response to identifying the contextual situation.

In the example discussed above, the scheduling component 160 dynamically tailors a migration policy that gives priority to important events and maximizes bandwidth utilization as shown in Tables 1, 2, 3, and 4. In the example, Georgia and Florida data migration is prioritized and will migrate to AWS and Azure. Where the hurricane is predicted to impact Florida 70% more than Georgia, the scheduling component 160 may direct more bandwidth to Florida. For example, the communication component 140 and the scheduling component 160 may enable the Florida data source to migrate data at 70 Mbps and Georgia to migrate data at 40 Mbps to the connector. The connector may then push the data to AWS/Azure at full speed (e.g., 120 Mbps). Where the connector can process 200 Mbps, the scheduling component 160 may schedule job processing for the remaining bandwidth of the connector (e.g., 80 Mbps). In some instances, the scheduling component 160 may schedule job processing for a contextual situation having a next highest event score. For example, heatwave analysis applications may be allowed to process data using the remaining bandwidth. As shown in the tables, the California data source may be scheduled to push data at a rate of 80 Mbps to a suitable back-end cloud. The scheduling component 160 may then cause the connector to stop data migration from the Washington data source temporarily (e.g., until the hurricane contextual situation ends).

Figure 3:
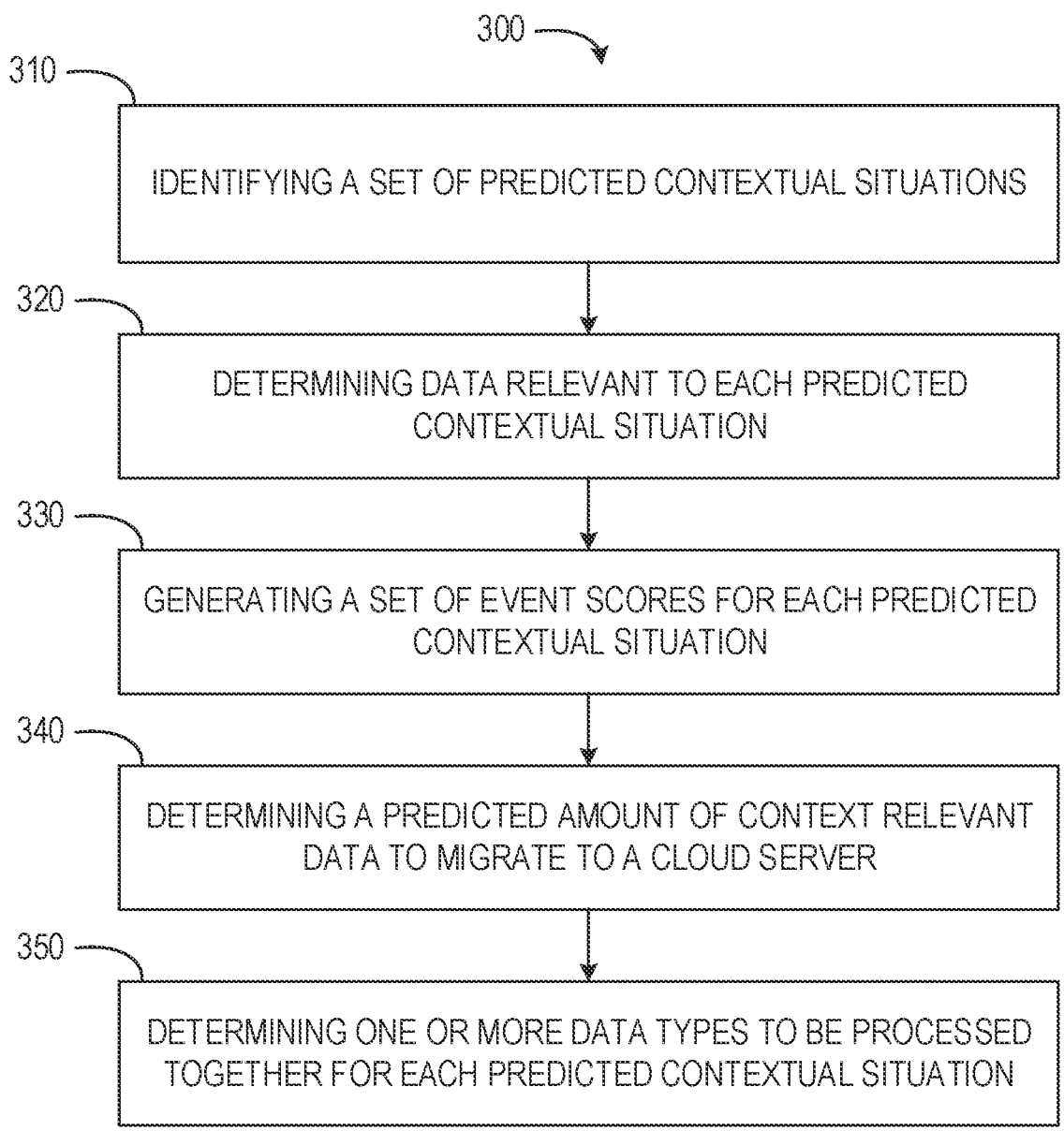
FIG. 3 depicts a flow diagram of a computer-implemented method for context relevant data migration to a cloud server with job rescheduling, according to at least one embodiment.

FIG. 3 shows a flow diagram of an embodiment of a computer-implemented method 300 for context relevant data migration to a cloud server with job rescheduling. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the prediction component 170 identifies a set of predicted contextual situations. The set of predicted contextual situations may be identified based on a set of data sources available for data migration to a cloud server. The set of predicted contextual situations may also be identified based on a set of applications associated with the cloud server. In some embodiments, the prediction component 170 uses historical learning to correlate predicted contextual situations with data sources, data sets, or data elements. For example, manufacturing application data may be identified as being related to environmental data in a contextual situation.

In operation 320, the prediction component 170 determines data relevant to each predicted contextual situation of the set of predicted contextual situations. In some embodiments, the relevant data is determined to include data from a set of data sets and a set of data sources. Each data source may be uniquely identified, having metadata, data types, and other aspects unique to each data source. In some embodiments, each data source may have multiple data types. For example, data types may include product information, price information, customer information, location information, and other suitable and relevant data associated with a business application (e.g., a sales application).

In some embodiments, the prediction component 170 classifies the data based on relevancy of the data to at least one predicted contextual situation. The prediction component 170 may classify the generated data based on predicted contextual situations and the determined relevancy to each predicted contextual situation. In some embodiments, while performing classification of data received from various data sources, the prediction component 170 determines dependency among various data sources and data occurring within data sets associated with those data sources.

In operation 330, the prediction component 170 generates a set of event scores. The set of event scores may be generated by assigning each predicted contextual situation of the set of contextual situations with an event score. In some embodiments, data associated with a predicted contextual situation will be prioritized for cloud server migration based on an event score. Prioritization of event related data enables cloud servers to proactively process the data and make it ready for a user encountering a contextual situation.

In operation 340, the prediction component 170 determines a predicted amount of context relevant data to migrate to the cloud server. In some embodiments, a predicted amount of context relevant data may be predicted for each predicted contextual situation. The prediction component 170 may predict a volume of context relevant data appropriate for migration to a cloud server given a contextual situation arising. The volume of context relevant data may be an amount of data for fact-based decision making. In some embodiments, the amount of context relevant data is determined using a machine learning or artificial intelligence. The prediction component 170 may determine a data selection scheme based on the predicted amount of context relevant data to inform fact-based decision making for the contextual situation. The data selection scheme may be random sampling, filter-based sampling, or any other suitable data sampling technique.

In operation 350, the prediction component 170 determines one or more data types to be processed together for each predicted contextual situation. In some embodiments, data determined to be relevant to predicted contextual situations may be associated with one or more data types. The prediction component 170 may correlate different types of data to be processed together for each contextual situation based on historical use or usage patterns.

Figure 4:
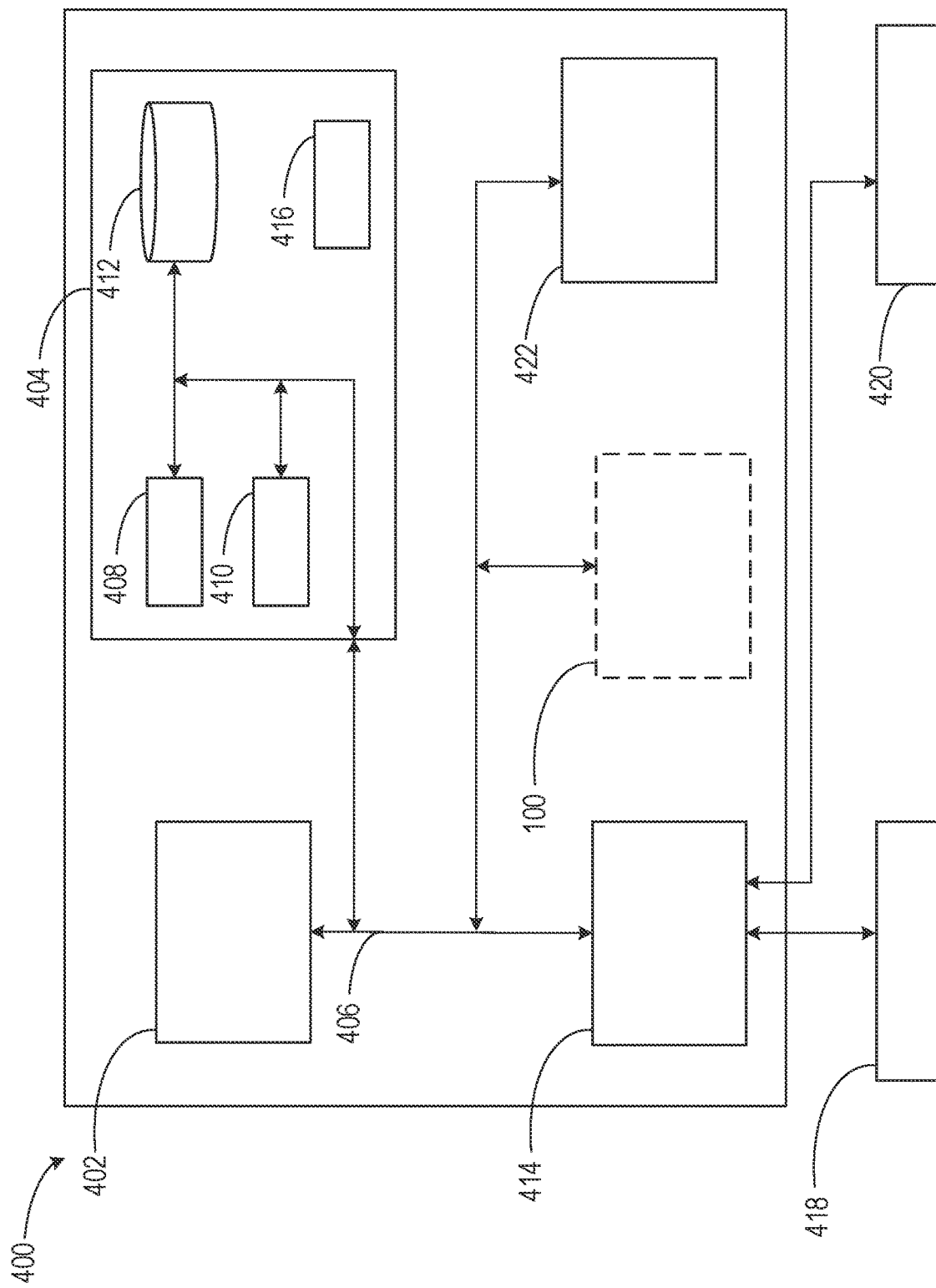
FIG. 4 depicts a block diagram of a computing system for context relevant data migration to a cloud server with job rescheduling, according to at least one embodiment.

Embodiments of the present disclosure may be implemented together with virtually any type of computer, regardless of the platform is suitable for storing and/or executing program code. FIG. 4 shows, as an example, a computing system 400 (e.g., cloud computing system) suitable for executing program code related to the methods disclosed herein and for context relevant data migration to a cloud server with job rescheduling.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the context component 110, the application component 120, the characteristic component 130, the communication component 140, the prioritization component 150, the scheduling component 160, and the prediction component 170, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
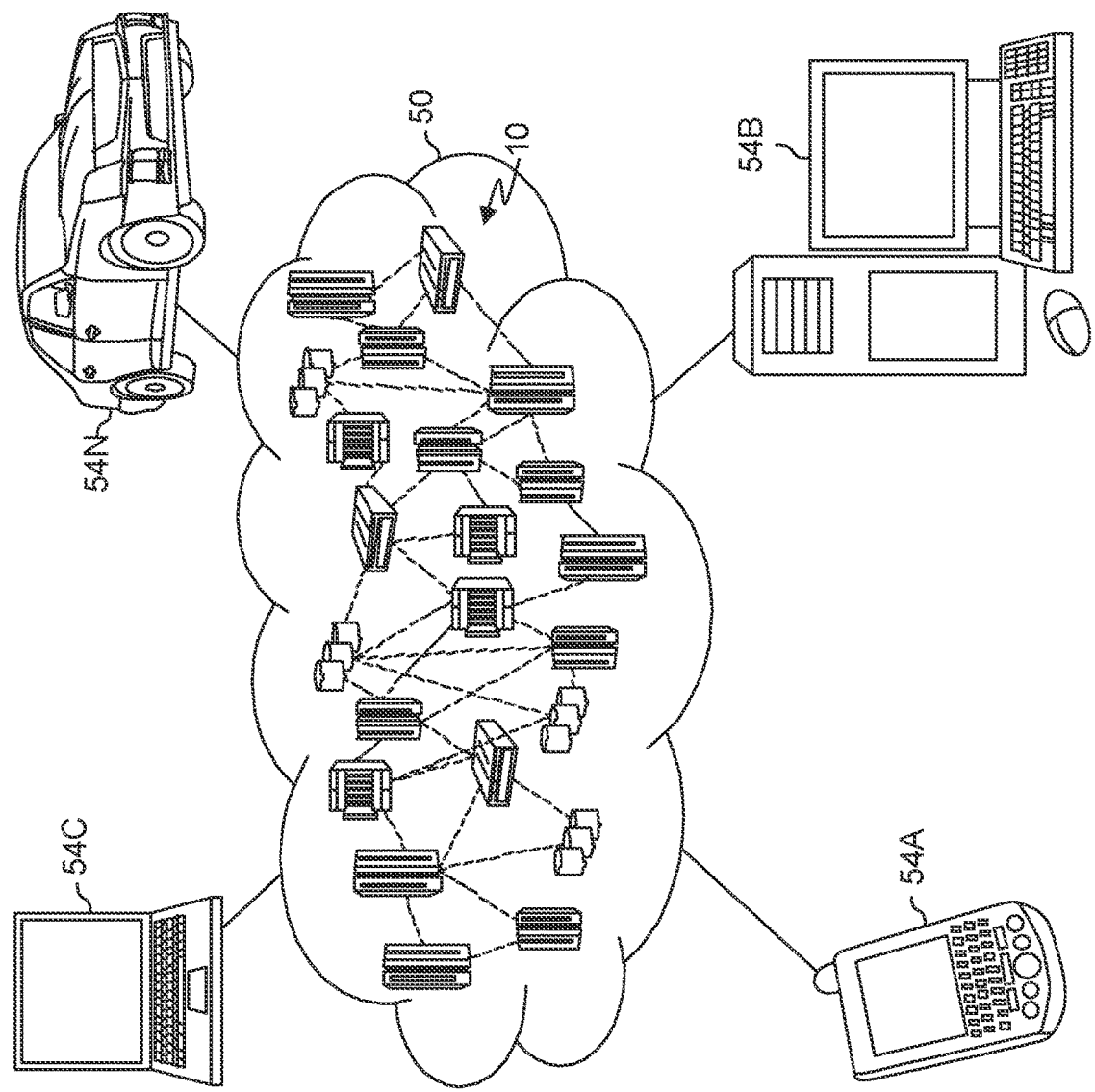
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
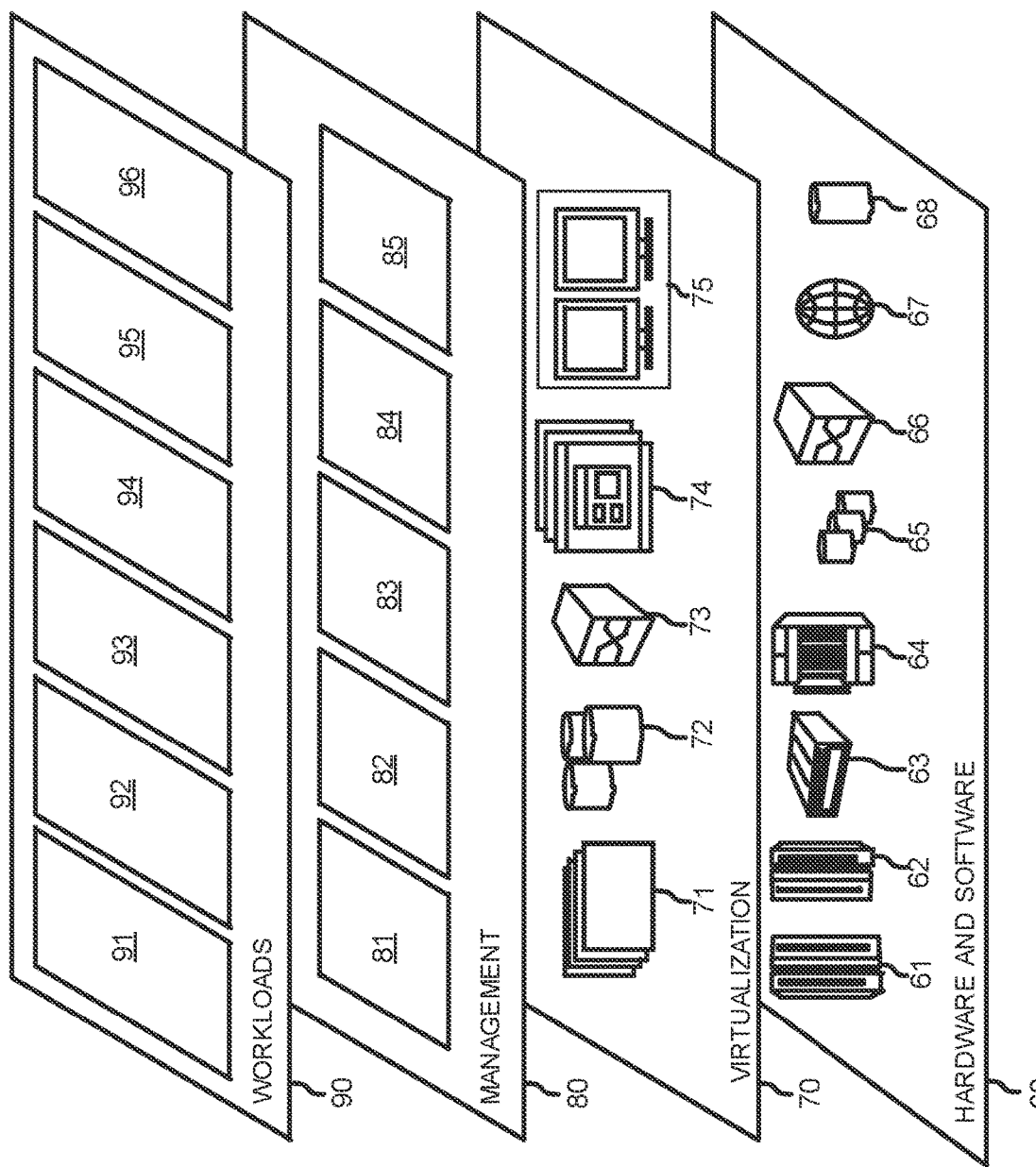
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and contextual data migration processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:
1. A computer-implemented method, comprising:
identifying a set of predicted contextual situations based on a set of data sources and a set of applications associated with a cloud server;
determining data relevant to a respective predicted contextual situation, the data including one or more data sets and one or more data sources;
generating a set of event scores by assigning the respective predicted contextual situation of the set of contextual situations with a respective event score;
identifying a contextual situation, from the set of predicted contextual situations, associated with at least a portion of data sets available for migration to the cloud server, the data sets being provided by the set of data sources, and wherein the contextual situation is associated with an event score;

identifying an application associated with the contextual situation;

determining bandwidths for one or more data sources associated with the portion of data sets associated with the contextual situation;

selecting one or more data sets for prioritization based on priority scores of respective data sets associated with the contextual situation, wherein the priority scores are based on the event score of the contextual situation, a relevancy of the respective data sets to the contextual situation, and the bandwidth for the one or more data sources; and scheduling a job processing sequence of the selected one or more data sets based on the priority scores.

2. The method of claim 1, wherein determining data relevant to the respective predicted contextual situation further comprises:

classifying the data based on a respective relevancy of the data to one or more predicted contextual situations.

3. The method of claim 2, further comprising:

determining, for the respective predicted contextual situation, a predicted amount of context relevant data to migrate to the cloud server.

4. The method of claim 3, wherein data relevant to the respective predicted contextual situation is associated with one or more data types, the method further comprising:

determining one or more data types to be processed together for the respective predicted contextual situation.

5. The method of claim 4, wherein the job processing sequence of the selected one or more data sets is further scheduled, at least in part, based on the predicted amount of context relevant data associated with the contextual situation, the one or more data types to be processed together for the contextual situation, and the priority score of the one or more data sets.

6. The method of claim 1, further comprising:

determining a set of use characteristics for the data sets based on the contextual situation and the application; and wherein scheduling the job processing sequence is further based on the set of use characteristics.

7. A system, comprising:

one or more processors; and a computer-readable storage medium, coupled to the one or more processors, storing program instructions that, when executed by the one or more processors, cause the one or more processors to perform operations comprising:

identifying a set of predicted contextual situations based on a set of data sources and a set of applications associated with a cloud server;

determining data relevant to a respective predicted contextual situation, the data including one or more data sets and one or more data sources;

generating a set of event scores by assigning the respective predicted contextual situation of the set of contextual situations with a respective event score;

identifying a contextual situation, from the set of predicted contextual situations, associated with at least a portion of data sets available for migration to the cloud server, the data sets being provided by the set of data sources, and wherein the contextual situation is associated with an event score;

identifying an application associated with the contextual situation;

determining bandwidths for one or more data sources associated with the portion of data sets associated with the contextual situation;

selecting one or more data sets for prioritization based on priority scores of respective data sets associated with the contextual situation, wherein the priority scores are based on the event score of the contextual situation, a relevancy of the respective data sets to the contextual situation, and the bandwidth for the one or more data sources; and scheduling a job processing sequence of the selected one or more data sets based on the priority scores.

8. The system of claim 7, wherein determining data relevant to the respective predicted contextual situation further comprises:

classifying the data based on the relevancy of the data to one or more predicted contextual situations.

9. The system of claim 8, wherein the operations further comprise:

determining, for the respective predicted contextual situation, a predicted amount of context relevant data to migrate to the cloud server.

10. The system of claim 9, wherein data relevant to the respective predicted contextual situation is associated with one or more data types, the operations further comprise:

determining one or more data types to be processed together for the respective predicted contextual situation.

11. The system of claim 10, wherein the job processing sequence of the selected one or more data sets is further scheduled, at least in part, based on the predicted amount of context relevant data associated with the contextual situation, the one or more data types to be processed together for the contextual situation, and the priority score of the one or more data sets.

12. The system of claim 7, wherein the operations further comprise:

determining a set of use characteristics for the data sets based on the contextual situation and the application; and wherein scheduling the job processing sequence is further based on the set of use characteristics.

13. A computer program product comprising a computer readable storage medium having program instructions embodied therewith, the program instructions being executable by one or more processors to cause the one or more processors to perform operations comprising:

identifying a set of predicted contextual situations based on a set of data sources and a set of applications associated with a cloud server;

determining data relevant to a respective predicted contextual situation, the data including one or more data sets and one or more data sources;

generating a set of event scores by assigning the respective predicted contextual situation of the set of contextual situations with a respective event score;

identifying a contextual situation associated with at least a portion of data sets available for migration to a cloud server, the data sets being provided by a set of data sources, and wherein the contextual situation is associated with an event score;

identifying an application associated with the contextual situation;

determining bandwidths for one or more data sources associated with the portion of data sets associated with the contextual situation;

selecting one or more data sets for prioritization based on priority scores of respective data sets associated with the contextual situation, wherein the priority scores are based on the event score of the contextual situation, a relevancy of the respective data sets to the contextual situation, and the bandwidth for the one or more data sources; and scheduling a job processing sequence of the selected one or more data sets based on the priority scores.

14. The computer program product of claim 13, wherein determining data relevant to the respective predicted contextual situation further comprises:

classifying the data based on the relevancy of the data to one or more predicted contextual situations.

15. The computer program product of claim 14, wherein the operations further comprise:

determining, for the respective predicted contextual situation, a predicted amount of context relevant data to migrate to the cloud server.

16. The computer program product of claim 15, wherein data relevant to the respective predicted contextual situation is associated with one or more data types, the operations further comprise:

determining one or more data types to be processed together for the respective predicted contextual situation; and wherein the job processing sequence of the selected one or more data sets is further scheduled, at least in part, based on the predicted amount of context relevant data associated with the contextual situation, the one or more data types to be processed together for the contextual situation, and the priority score of the one or more data sets.

17. The computer program product of claim 13, wherein the operations further comprise:

determining a set of use characteristics for the data sets based on the contextual situation and the application; and wherein scheduling the job processing sequence is further based on the set of use characteristics.

* * * * *